United States Patent Office 3,222,388
Patented Dec. 7, 1965

3,222,388
DIARYL-ACETONITRILES AND 2,2,3-
TRIARYLPROPIONITRILES
Melvin Perelman, Indianapolis, Ind., assignor to Eli Lilly
and Company, Indianapolis, Ind., a corporation of
Indiana
No Drawing. Filed Apr. 20, 1962, Ser. No. 188,980
7 Claims. (Cl. 260—465)

This invention relates to certain novel 2,2,3-triaryl-propionitriles. More particularly, this invention relates to such triarylpropionitriles in which one of the aryl group in the 2-position is substituted by an aminoalkoxy or N-substituted aminoalkoxy basic ether side chain.

The compounds provided by this invention can be represented by the formula

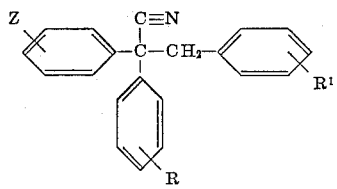

in which Z is a basic ether side chain of the type

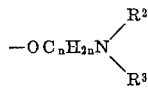

wherein $n$ is 2, 3, or 4, $R^2$ and $R^3$ when taken separately are hydrogen or lower alkyl containing from one to four carbon atoms, and $R^2$ and $R^3$, when taken together with the nitrogen atom to which they are attached, form a heterocyclic ring such as pyrrolidine, piperidine, morpholine, piperazine and the like; R and $R^1$ are hydrogen, halogen, methyl, methoxy, nitro, trifluoromethyl, or aryl, with the restriction that R and $R^1$ cannot both be hydrogen. Preferred compounds are those in which the group Z is in the position meta or para to the point of attachment of the benzene ring, the para derivatives being especially preferred. Included within the scope of the invention are the salts of the compounds with pharamaceutically acceptable acids such as hydrochloric, hydrobromic hydriodic, phophoric, sulfuric, acetic, benzoic, citric, maleic, malic, naphthalenesulfonic, oxalic, pamoic, salicylic, succinic, tartaric, p-toluenesufonic, and like acids.

The methods employed for the prearation of the new triarypropionitriles are equally effective without regard to the position on the ring of the basic ether group Z. One such method, leading to a compound in which Z is in the para position, can be depicted by the following reaction sequence:

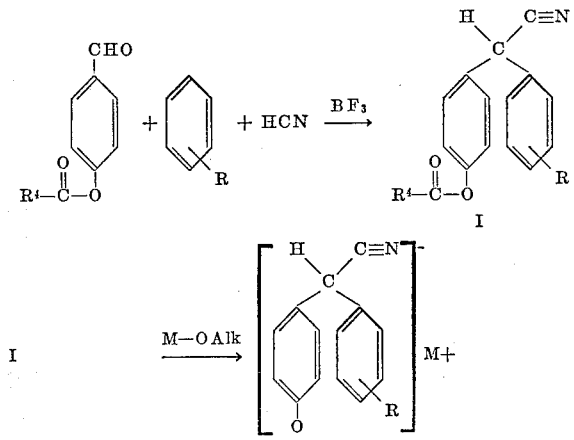

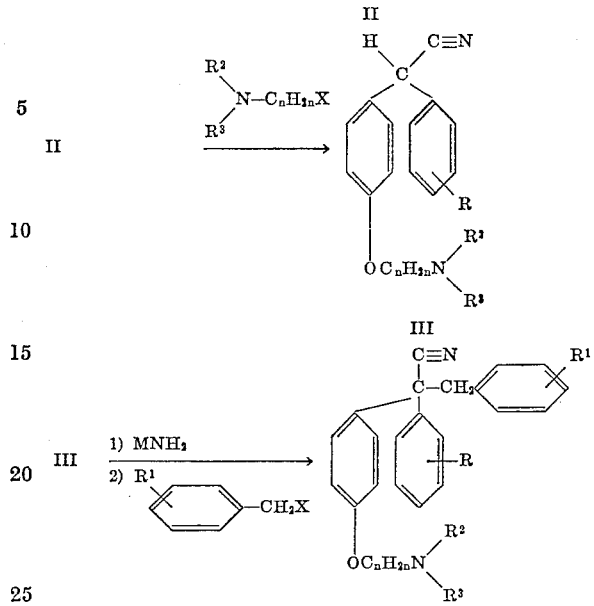

In the above reaction scheme, $n$, R, and $R^1$ have the same meanings as hereinbefore employed; $R^2$ and $R^3$ when taken separately are lower alkyl containing from one to four carbon atoms, and $R^2$ and $R^3$, when taken together with the nitrogen atom to which they are attached form a heterocyclic ring; $R^4$ is alkyl or aryl; M is an alkali metal; Alk is an alkyl group; and X is halogen, for example chlorine, bromine, or iodine.

As the first step in the preparation of the compounds, a mixture of liquid hydrogen cyanide, an ether of p-hydroxybenzaldehyde, and an excess of an aryl hydrocarbon, which serves as both a reactant and a solvent for the reaction, is caused to react by bubbling a boron trifluoride catalyst through the reaction mixture. The reaction, which is initially exothermic, is completed by heating the mixture. The resulting α-aryl-α-acyloxyphenylacetonitrile or α-aroyloxyphenylacetonitrile is then heated with an alkali-metal alkoxide such as sodium methoxide, sodium ethoxide, potassium t-butoxide, and the like, to cleave the ester and form the alkali-metal salt of the α-aryl-α-hydroxyphenylacetonitrile. The basic ether of this derivative is prepared by reaction of the salt with the aminoalkyl halide

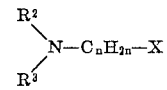

The final step in the preparation of the desired compound involves the alkylation of the substituted diarylacetonitrile in the usual manner, which comprises the formation of its metallo derivative by treatment with an alkali-metal amide followed by the reaction of said derivative with an appropriately substituted benzyl halide.

An alternative method of preparing the desired triarylpropionitriles can be employed. In this method, the alkali-metal salt of the α-aryl-α-hydroxyphenylacetonitrile is prepared as before. The benzyl ether of this derivative is then prepared by its reaction with a benzyl halide to give an α-aryl-α-benzyloxyphenylacetonitrile. Alkylation of this diarylacetonitrile is accomplished as before by treatment with an alkali-metal amide followed by an appropriately substituted benzyl halide. The 2-aryl-2-benzyloxyphenyl-3-arylpropionitrile so obtained is reacted with a suitable cleaving agent, such as for example 48 percent hydrobromic acid, to produce a 2-aryl-2-hydroxyphenyl-3-arylpropionitrile, to which the basic ether side chain can be attached by reaction of its salt, obtained by treating the phenol with a base, with an aminoalkyl halide of the type

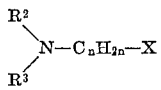

When the desired final product is a primary or secondary amine, the alkylation of the 2-aryl-2-hydroxyphenyl - 3 - arylpropionitrile is effected with an $R^2R^3NC_nH_{2n}X$ compound in which one of the groups $R^1$ and $R^3$ is acyl or aroyl, such as acetyl, benzoyl, and the like, and the other is hydrogen or an alkyl group containing from one to four carbon atoms. Preferential hydrolysis of the acyl or aroyl group provides the desired primary or secondary amine. This selective hydrolysis is readily accomplished because of the striking resistance to hydrolysis of the nitrile grouping, which is probably due to steric hindrance.

Illustrative of the compounds which can be prepared by the above-described methods are the following:

2-p-tolyl-2-[4-(2-aminoethoxy)phenyl]-3-p-chlorophenylpropionitrile
2-p-tolyl-2-[4-(2-methylaminoethoxy)phenyl]-3-p-chlorophenylpropionitrile
2-p-tolyl-2-[4-(2-ethylaminoethoxy)phenyl]-3-p-chlorophenylpropionitrile
2-p-tolyl-2-[4-(2-dimethylaminoethoxy)phenyl]-3-p-chlorophenylpropionitrile
2-p-tolyl-2-[4-(2-diethylaminoethoxy)phenyl]-3-p-chlorophenylpropionitrile
2-p-tolyl-2-[4-(2-dipropylaminoethoxy)phenyl]-3-p-chlorophenylpropionitrile
2-p-tolyl-2-[4-(2-diisopropylaminoethoxy)phenyl]-3-p-chlorophenylpropionitrile
2-p-tolyl-2-[4-(2-dibutylaminoethoxy)phenyl]-3-p-chlorophenylpropionitrile
2-p-tolyl-2-[4-(2-pyrrolidinoethoxy)phenyl]-3-p-chlorophenylpropionitrile
2-p-tolyl-2-[4-(2-piperidinoethoxy)phenyl]-3-p-chlorophenylpropionitrile
2-p-tolyl-2-[4-(2-morpholinoethoxy)phenyl]-3-p-chlorophenylpropionitrile
2-p-tolyl-2-[4-(3-aminopropoxy)phenyl]-3-p-chlorophenylpropionitrile
2-p-tolyl-2-[4-(3-methylaminopropoxy)phenyl]-3-p-chlorophenylpropionitrile
2-p-tolyl-2-[4-(3-ethylaminopropoxy)phenyl]-3-p-chlorophenylpropionitrile
2-p-tolyl-2-[4-(3-dimethylaminopropoxy)phenyl]-3-p-chlorophenylpropionitrile
2-p-tolyl-2-[4-(3-diethylaminopropoxy)phenyl]-3-p-chlorophenylpropionitrile
2-p-tolyl-2-[4-(2-aminoisopropoxy)phenyl]-3-p-chlorophenylpropionitrile
2-p-tolyl-2-[4-(2-methylaminoisopropoxy)phenyl]-3-p-chlorophenylpropionitrile
2-p-tolyl-2-[4-(2-methylaminoisopropoxy)phenyl]-3-p-chlorophenylpropionitrile
2-p-tolyl-2-[4-(2-dimethylaminoisopropoxy)phenyl] 3-p-chlorophenylpropionitrile
2-p-tolyl-2-[4-(2-diethylaminoisopropoxy)phenyl]-3-p-chlorophenylpropionitrile
2-p-tolyl-2-[4-(4-diethylaminobutoxy)phenyl]-3-p-chlorophenylpropionitrile
2-p-tolyl-2-[3-(2-methylaminoethoxy)phenyl]-3-p-chlorophenylpropionitrile
2-p-tolyl-2-[3-(2-ethylaminoethoxy)phenyl]-3-p-chlorophenylpropionitrile
2-p-tolyl-2-[3-(2-dimethylaminoethoxy)phenyl]-3-p-chlorophenylpropionitrile
2-p-tolyl-2-[3-(2-diethylaminoethoxy)phenyl]-3-p-chlorophenylpropionitrile
2-p-tolyl-2-[3-(3-diethylaminopropoxy)phenyl]-3-p-chlorophenylpropionitrile
2-p-tolyl-2-[3-(2-dimethylaminoisopropoxy)phenyl]-3-p-chlorophenylpropionitrile
2-p-tolyl-2-[3-(2-diethylaminoisopropoxy)phenyl]-3-p-chlorophenylpropionitrile
2-p-tolyl-2-[2-(2-ethylaminoethoxy)phenyl]-3-p-chlorophenylpropionitrile
2-p-tolyl-2-[2-(2-dimethylaminoethoxy)phenyl]-3-p-chlorophenylpropionitrile
2-p-tolyl-2-[2-(2-diethylaminoethoxy)phenyl]-3-p-chlorophenylpropionitrile
2-p-tolyl-2-[2-(3-diethylaminopropoxy)phenyl]-3-p-chlorophenylpropionitrile
2-p-tolyl-2-[2-(2-diethylaminoisopropoxy)phenyl]-3-p-chlorophenylpropionitrile
2-p-tolyl-2-[4-(2-diethylaminoethoxy)phenyl]-3-o-chlorophenylpropionitrile
2-p-tolyl-2-[4-(2-diethylaminoethoxy)phenyl]-3-p-methoxyphenylpropionitrile
2-p-tolyl-2-[4-(2-diethylaminoethoxy)phenyl]-3-m-chlorophenylpropionitrile
2-p-tolyl-2-[4-(2-diethylaminoethoxy)phenyl]-3-p-trifluoromethylphenylpropionitrile
2-p-tolyl-2-[4-(2-diethylaminoethoxy)phenyl]-3-p-fluorophenylpropionitrile
2-p-tolyl-2-[4-(2-diethylaminoethoxy)phenyl]-3-p-nitrophenylpropionitrile
2-p-tolyl-2-[4-(2-diethylaminoethoxy)phenyl]-3-m-nitrophenylpropionitrile
2-p-tolyl-2-[4-(2-diethylaminoethoxy)phenyl]-3-(2,4-dichlorophenyl)propionitrile
2-p-tolyl-2-[4-(2-diethylaminoethoxy)phenyl]-3-(3,5-dichlorophenyl)propionitrile
2-p-tolyl-2-[4-(2-diethylaminoethoxy)phenyl]-3-phenylpropionitrile
2-p-xenyl-2-[4-(2-diethylaminoethoxy)phenyl]-3-p-chlorophenylpropionitrile The triaryl propionitriles of this invention are hypocholesteremic agents and are therefore useful in decreasing blood cholesterol levels.

The intermediate basic ethers of the formula

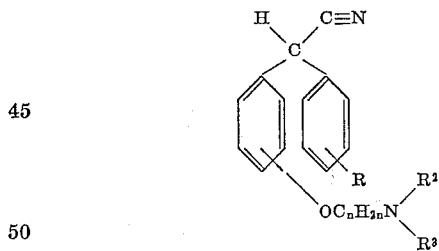

which are employed in the synthesis of the triarylpropionitriles are novel compounds and also form part of this invention. Likewise, the 2-aryl-2-hydroxyphenyl-3-arylpropionitriles having the formula

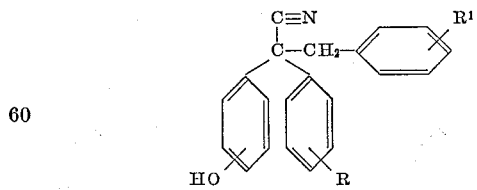

are novel intermediates and constitute still another part of the invention.

In order that the invention may be more clearly understood, the following examples are provided by way of illustration. Numerous variations will be apparent to those skilled in the art and are to be considered to lie within the scope of this invention.

*Example 1*

Into a three-necked flask equipped with a mechanical stirrer, condenser, and gas inlet tube are placed 125 g. of p-benzoyloxybenzaldehyde, one liter of toluene and 150 ml. of hydrogen cyanide. The gas inlet tube is adjusted to reach below the surface of the liquid in the flask and gaseous boron trifluoride is bubbled through the stirred solution, which gradually turns yellow and then red. The temperature rises gradually to 30–35° C. After about forty-five minutes, the reaction mixture is warmed to about 50–55° C. and maintained at this temperature for about six hours. At this time crystals begin to form in the condenser and heating is discontinued. After standing overnight at room temperature, the reaction mixture is poured into water and the product is extracted with ether. The ether extracts are washed successively with 10 percent aqueous sodium hydroxide, water, 25 percent aqueous sodium bisulfite and water. After being dried over anhydrous calcium chloride, the ether solution is concentrated in vacuo. From the resulting light yellow oil, crystals of α-p-tolyl-α-p-benzoyloxyphenylacetonitrile gradually are formed. Two recrystallizations from ethanol give material melting at about 118–119° C.

Example 2

A solution of 1.95 g. of sodium in 100 ml. of absolute ethanol is prepared and 26.2 g. of α-p-tolyl-α-p-benzoyloxyphenylacetonitrile are added. The solution is then heated under reflux for one hour, after which it is cooled and an ether solution of β-diethylaminoethyl chloride (prepared in the usual fashion from 17.2 g. of the corresponding hydrochloride and one equivalent of sodium hydroxide) is added. The mixture is reheated to reflux temperature and refluxing is continued for two hours, the ether being allowed to evaporate during this period. The mixture is cooled, poured into water, and extracted with ether. The ether extracts are combined and washed successively with 10 percent aqueous sodium hydroxide, water, and brine. After drying over anhydrous sodium carbonate and removal of the solvents in vacuo there remains a yellow oil comprising α-p-tolyl-α-[4-(2-diethylaminoethoxy)phenyl]acetonitrile. The hydrochloride prepared from this material and recrystallized from ethyl acetate melts at about 114–118° C.

Example 3

Sodium amide is prepared from 1.97 g. of sodium in 500 ml. of liquid ammonia using a few crystals of hydrated ferric nitrate to catalyze the reaction. When the formation of sodium amide is complete, an ether solution containing 22.12 g. of α-p-tolyl-α-[4-(2-diethylaminoethoxy)phenyl]acetonitrile is added with stirring. After about fifteen minutes, a solution of 10.7 g. of p-methoxybenzyl chloride in ether is added. After about an hour, excess solid ammonium chloride is added to decompose any unreacted sodium amide, and then a large volume of ether is added. The ammonia is permitted to evaporate, water is added, and the mixture is transferred to a separatory funnel to which some sodium carbonate is added. The product is extracted with ether and the extracts are washed successively with sodium hydroxide solution, water, and brine. After drying over anhydrous magnesium sulfate and concentration in vacuo there remain about 29 g. of an oil. This residue is dissolved in ether, separated from a small amount of precipitated gummy material, and treated with anhydrous hydrogen chloride to give the hydrochloride of 2-[4-(2-diethylaminoethoxy)phenyl] - 2 - p - tolyl - 3 - p-methoxyphenylpropionitrile which, after digestion with a mixture of acetone and ethyl acetate, melts at about 175–178° C.

Example 4

A solution of 19.28 g. of α-p-tolyl-α-p-benzoyloxyphenylacetonitrile and 1.43 g. of sodium in 75 ml. of absolute ethanol is heated under reflux for one hour and then 9.42 g. of benzyl chloride are added. The reaction mixture is heated under reflux for an additional one and one-half hours and is then cooled and poured into water. The solid which precipitates is extracted into chloroform and the chloroform extracts are combined, washed successively with water, and brine, and dried over anhydrous magnesium sulfate. Removal of the volatile solvents in vacuo leaves a residual oil from which crystals of the desired α-p-tolyl-α-p-benzyloxyphenylacetonitrile separate on standing. Recrystallization from a mixture of acetone and petroleum ether affords about 14.5 g. of product melting at about 120–123° C.

Example 5

A solution of potassium amide in liquid ammonia is prepared from 2 g. of potassium in liquid ammonia containing a few crystals of ferric chloride to catalyze the reaction. A solution of 14.48 g. of α-p-tolyl-α-p-benzyloxyphenylacetonitrile is added, followed in about fifteen minutes by 8.22 g. of p-chlorobenzyl chloride. After an hour the unreacted potassium amide is decomposed and the product is recovered as in Example 3. The material so obtained is recrystallized from a mixture of acetone and petroleum ether to give 2-p-tolyl-2-p-benzyloxyphenyl-3-p-chlorophenylpropionitrile melting at about 143–145° C.

Example 6

A mixture of 7 g. 2-p-tolyl-2-p-benzyloxyphenyl-3-p-chlorophenylpropionitrile, 200 ml. of acetic acid and 150 ml. of 47 percent aqueous hydrobromic acid is heated under reflux for two hours. Upon cooling, a solid precipitates and is separated by filtration. After being washed with water, the solid is dissolved in chloroform and allowed to stand over solid potassium carbonate to remove the last traces of acid. After filtration and removal of the chloroform there remains an oily solid which is crystallized from a mixture of ethyl acetate and petroleum ether. Further recrystallization from the same solvent mixture yields 2-p-tolyl-2-p-hydroxyphenyl-3-p-chlorophenylpropionitrile melting at about 153–156° C.

Example 7

To a solution of 0.467 g. of sodium in absolute ethanol there are added with stirring 3.15 g. of 2-p-tolyl-2-p-hydroxyphenyl-3-p - chlorophenylpropionitrile. Stirring is continued for about ten minutes and then 1.57 g. of γ-dimethylaminopropyl chloride hydrochloride are added. The mixture is heated under reflux for about nineteen hours and is then poured into water. The product is extracted with ether and the ether extracts are washed successively with base, water, and brine and are then dried over anhydrous magnesium sulfate. After filtration to remove the drying agent and removal of the solvent in vacuo the 2-p-tolyl-2-[4-(3-dimethylaminopropoxy)phenyl]-3-p-chlorophenylpropionitrile remains as an oil. A crystalline oxalate salt prepared from this material and recrystallized from ethyl acetate melts at about 102–104° C.

Example 8

By employing p-chlorobenzyl chloride in the procedure of Example 3, 2-p-tolyl-2-[4-(2-diethylaminoethoxy)phenyl]-3-p-chlorophenylpropionitrile is obtained. The hydrochloride, recrystallized from ethyl acetate, melts at about 168–171° C.

Example 9

When m-chlorobenzyl chloride is employed in the procedure of Example 3, 2-p-tolyl-2-[4-(2-diethylaminoethoxy) - phenyl]-3-m-chlorophenylpropionitrile is obtained as an oil. The oxalate salt prepared from this oil and recrystallized from a mixture of ether and ethyl acetate melts at about 134° C.

Example 10

By employing o-chlorobenzyl chloride in the procedure of Example 3, 2-p-tolyl-2-[4-(2-diethylaminoethoxy) phenyl]-3-o-chlorophenyl propionitrile is obtained as an oil. Purification of the product by chromatography on alumina yields a material having a $pK_a$ of 8.3 by electrometric titration in 66 percent aqueous dimethylformamide and an analysis of 7.97 Cl (calc., 7.93).

Example 11

2 - p-tolyl-2-[4 - (2 - diethylaminoethoxy)phenyl]-3-phenylpropionitrile is obtained by employing benzyl chloride in the procedure of Example 3. Purification is accomplished via the extremely hygroscopic salt with oxalic acid.

Example 12

When α-chloro-p-xylene is employed in the procedure of Example 3, 2-p-tolyl-2-[4-(2-diethylaminoethoxy)phenyl]-3-p-tolylpropionitrile is obtained as the hydrochloride melting at about 158–160° C.

Example 13

By substituting p-trifluoromethylbenzyl chloride for p-methoxybenzyl chloride in the procedure of Example 3, 2-p-tolyl-2-[4-(2-diethylaminoethoxy)phenyl]-3-p-trifluoromethylphenylpropionitrile is obtained. The hydrochloride after recrystallization from ethyl acetate melts at about 145–146° C.

Example 14

Using the procedure of Example 3 but replacing the p-methoxybenzyl chloride with p-fluorobenzyl chloride, 2-p-tolyl-2-[4-(2-diethylaminoethoxy)phenyl]-3-p - fluorophenylpropionitrile is obtained as a hydrochloride melting at about 144–148° C.

Example 15

By utilizing 2,4-dichlorobenzyl chloride in the procedure of Example 3, 2-p-tolyl-2-[4-(2-diethylaminoethoxy)phenyl]-3-(2,4-dichlorophenyl)propionitrile is obtained as a hydrochloride melting at about 164–166° C.

Example 16

By employing 3,4-dichlorobenzyl chloride in the procedure of Example 3, 2-p-tolyl-2-[4-(2-diethylaminoethoxy)phenyl]-3-(3,4-dichlorophenyl)propionitrile is obtained. The hydrochloride of this compound exists in two different crystalline modifications, one melting at about 149–151° C., the other melting at about 201–203° C.

Example 17

When the p-methoxybenzyl chloride is replaced with p-nitrobenzyl chloride in Example 3, 2-p-tolyl-2-[4-(2-diethylaminoethoxy)phenyl] - 3-p-nitrophenylpropionitrile is obtained. Its hydrochloride, after recrystallization from a mixture of acetone and ethyl acetate melts at about 157–167° C.

Example 18

Replacing the p-methoxybenzyl chloride of Example 3 with m-nitrobenzyl chloride gives 2-p-tolyl-2-[4-(2-diethylaminoethoxy)phenyl]-3 - m-nitrophenylpropionitrile, the hydrochloride of which melts at about 158–162° C.

Example 19

The procedure of Example 7 is followed using β-benzoylaminoethyl chloride as the alkylating agent. The resulting 2-p-tolyl-2-[4-(2 - benzoylaminoethoxy)phenyl] 3-p-chlorophenylpropionitrile is heated under reflux for about eight hours with 5 N hydrochloric acid to effect a selective hydrolysis of the benzoyl group and yield 2-p-tolyl-2-[4-(2-aminoethoxy)phenyl] - 3 - p-chlorophenylpropionitrile.

Example 20

When N-benzoyl-β-methylaminoethyl chloride is employed as the alkylating agent in the procedure of Example 19, 2-p-tolyl-2-[4-(2-methylaminoethoxy)phenyl]-3-p-chlorophenylpropionitrile is obtained.

I claim:
1. A compound of the formula

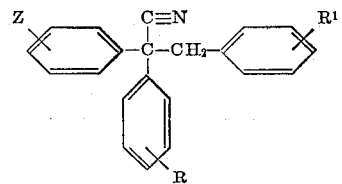

wherein Z is selected from the class consisting of basic ethers of the formula

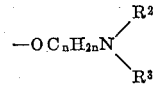

in which $n$ is a whole number from 2 to 4, $R^2$ and $R^3$ when taken separately are selected from the group consisting of hydrogen and lower alkyl containing from one to four carbon atoms, and $R^2$ and $R^3$, when taken together with the nitrogen atom to which they are attached, form a 5 to 6 membered heterocyclic ring selected from the group consisting of pyrrolidino, piperidino, morpholino, and piperazino; R and $R^1$ are selected from the group consisting of hydrogen, chlorine, fluorine, methyl, methoxy, nitro, trifluoromethyl, and monocyclic aryl not more than one of R and $R^1$ being hydrogen; and the acid addition salts thereof with pharmaceutically acceptable acids.

2. 2-p-tolyl-2-[4-(2 - diethylaminoethoxy)phenyl] - 3-p-chlorophenylpropionitrile.

3. 2-p-tolyl-2-[4-(2 - diethylaminoethoxy)phenyl] - 3-m-chlorophenylpropionitrile.

4. 2-p-tolyl-2-[4-(2 - diethylaminoethoxy)phenyl] - 3-o-chlorophenylpropionitrile.

5. 2-p-tolyl-2-[4-(2 - diethylaminoethoxy)phenyl] - 3-p-nitrophenylpropionitrile.

6. 2-p-tolyl-2-[4-(2 - diethylaminoethoxy)phenyl] - 3-m-nitrophenylpropionitrile.

7. A compound of the formula

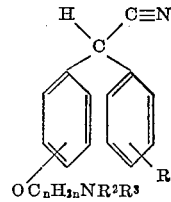

wherein $n$ is an integer from two to four, $R^2$ and $R^3$ when taken separately are lower alkyl containing from one to four carbon atoms and $R^2$ and $R^3$, when taken together with the nitrogen atom to which they are attached, form a 5 to 6 membered heterocyclic ring selected from the group consisting of pyrrolidino, piperidino, morpholino, and piperazino; and R is selected from the group consisting of hydrogen, chlorine, fluorine, methyl, methoxy, nitro, trifluoromethyl, and monocyclic aryl.

References Cited by the Examiner

FOREIGN PATENTS 1,075,631   2/1960   Germany.

OTHER REFERENCES

Bistrzycki et al.: Chemical Abstracts, 1911, volume 5, pp. 3824–3825.

Meyer et al.: Chemical Abstracts, 1924, volume 18, p. 2889.

Protiva et al.: Chemical Abstracts, 1957, p. 4976, volume 51.

CHARLES B. PARKER, *Primary Examiner.*

UNITED STATES PATENT OFFICE
CERTIFICATE OF CORRECTION

Patent No. 3,222,388

December 7, 1965

Melvin Perelman

It is hereby certified that error appears in the above numbered patent requiring correction and that the said Letters Patent should read as corrected below.

Column 1, line 44, after "bromic" insert a comma; same line 44, for "phophoric" read -- phosphoric --; line 46, for "p-toluenesufonic" read -- p-toluenesulfonic --; line 49, for "triarypropionitriles" read -- triarylpropionitriles --; same column 1, lines 63 to 71, after the closing bracket, for "M+" read -- $M^+$ --; column 2, line 35, for "ether" read -- ester --; line 43, for "α-aroyloxyphenylacetonitrile" read -- α-aryl-α-aroyloxyphenylacetonitrile --; column 3, line 12, for "$R^1$" read -- $R^2$ --; line 58, for "-(2-methylaminoisopropoxy)" read -- -(2-ethylaminoisopropoxy) --; column 4, line 33, for "-3-p-" read -- -3- --; column 6, line 59, after -diethylaminoethoxy)" insert a hyphen; line 67, for "ethoxy)-phenyl]-" read -- ethoxy)phenyl]- --.

Signed and sealed this 4th day of October 1966.

(SEAL)
Attest:

ERNEST W. SWIDER
Attesting Officer

EDWARD J. BRENNER
Commissioner of Patents